United States Patent [19]

Buckley, III

[11] Patent Number: 5,312,460
[45] Date of Patent: May 17, 1994

[54] FUEL COMPOSITIONS CONTAINING SUBSTANTIALLY STRAIGHT CHAIN ALKYLPHENYL POLY (OXYPROPYLENE) AMINO CARBAMATES

[75] Inventor: Thomas F. Buckley, III, Hercules, Calif.

[73] Assignee: Chevron Research Company, San Francisco, Calif.

[21] Appl. No.: 978,295

[22] Filed: Nov. 17, 1992

Related U.S. Application Data

[63] Continuation of Ser. No. 337,250, Apr. 13, 1989, abandoned, which is a continuation of Ser. No. 69,342, Jul. 2, 1987, abandoned.

[51] Int. Cl.$^5$ .................................................. C10L 1/22
[52] U.S. Cl. ........................................ 44/387; 44/333; 44/334; 44/344; 44/338
[58] Field of Search .................... 44/71, 77, 333, 334, 44/344, 338, 387

[56] References Cited

U.S. PATENT DOCUMENTS

| | | | |
|---|---|---|---|
| 4,160,648 | 7/1979 | Lewis | 44/63 |
| 4,191,537 | 3/1980 | Lewis | 44/71 |
| 4,197,409 | 4/1980 | Lilburn | 44/71 X |
| 4,236,020 | 11/1980 | Lewis | 44/71 X |
| 4,288,612 | 9/1981 | Lewis | 44/71 |
| 4,289,634 | 9/1981 | Lewis | 44/71 X |
| 4,294,714 | 10/1981 | Lewis | 44/71 X |
| 4,521,610 | 6/1985 | Plavac | 44/71 X |
| 4,695,291 | 9/1987 | Plavac | 44/71 X |

*Primary Examiner*—Jacqueline V. Howard
*Attorney, Agent, or Firm*—Claude J. Caroli

[57] ABSTRACT

Disclosed is a fuel composition comprising a hydrocarbon boiling in the gasoline or diesel range and from about 30 to about 5,000 parts per million of an alkylphenyl poly(oxypropylene) aminocarbamate having at least one basic nitrogen and an average molecular weight of about 600 to 6,000 and wherein the alkyl group is substantially straight-chain of at least 15 carbon atoms. The instant invention is based on the discovery that use of the unique hydrocarbyl group, i.e., an alkylphenyl group wherein the alkyl group is derived from a substantially straight-chain alkyl group of at least 15 carbon atoms imparts to the alkylphenyl poly(oxypropylene) aminocarbamate not only lubricating oil compatibility but also an unexpected decrease in crankcase deposits.

16 Claims, No Drawings

FUEL COMPOSITIONS CONTAINING SUBSTANTIALLY STRAIGHT CHAIN ALKYLPHENYL POLY (OXYPROPYLENE) AMINO CARBAMATES

This is a continuation of application Ser. No. 337,250 filed Apr. 13, 1989, which is a continuation of application Ser. No. 069,342 filed Jul. 2, 1987, both now abandoned.

BACKGROUND OF THE INVENTION

1. Field of the Invention

Numerous deposit-forming substances are inherent in hydrocarbon fuels. These substances when used in internal combustion engines tend to form deposits on and around constricted areas of the engine contacted by the fuel. Typical areas commonly and sometimes seriously burdened by the formation of deposits include carburetor ports, the throttle body and venturies, engine intake valves, etc.

Deposits adversely affect the operation of the vehicle. For example, deposits on the carburetor throttle body and venturies increase the fuel to air ratio of the gas mixture to the combustion chamber thereby increasing the amount of unburned hydrocarbon and carbon monoxide discharged from the chamber. The high fuel-air ratio also reduces the gas mileage obtainable from the vehicle.

Deposits on the engine intake valves when they get sufficiently heavy, on the other hand, restrict the gas mixture flow into the combustion chamber. This restriction, starves the engine of air and fuel and results in a loss of power. Deposits on the valves also increase the probability of valve failure due to burning and improper valve seating. In addition, these deposits may break off and enter the combustion chamber possibly resulting in mechanical damage to the piston, piston rings, engine head, etc.

The formation of these deposits can be inhibited as well as removed by incorporating an active detergent into the fuel. These detergents function to cleanse these deposit-prone areas of the harmful deposits, thereby enhancing engine performance and longevity. There are numerous detergent-type gasoline additives currently available which, to varying degrees, perform these functions.

Two factors complicate the use of such detergent-type gasoline additives. First, with regard to automobile engines that require the use of nonleaded gasolines (to prevent disablement of catalytic converters used to reduce emissions), it has been found difficult to provide gasoline of high enough octane to prevent knocking and the concomitant damage which it causes. The chief problem lies in the area of the degree of octane requirement increase, herein called "ORI", which is caused by deposits formed by the commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period, will reach an equilibrium. This is apparently caused by an amount of deposits in the combustion chamber. Equilibrium is typically reached after 5,000 to 15,000 miles of automobile operation.

The octane requirement increase in particular engines used with commercial gasolines will vary at equilibrium from 5 to 6 octane units to as high as 12 or 15 units, depending upon the gasoline compositions, engine design and type of operation. The seriousness of the problem is thus apparent. A typical automobile with a research octane requirement of 85, when new, may after a few months of operation require 97 research octane gasoline for proper operation, and little unleaded gasoline of that octane is available. The ORI problem also exists in some degree with engines operated on leaded fuels. U.S. Pat. Nos. 3,144,311; 3,146,203; and 4,247,301 disclose lead-containing fuel compositions having reduced ORI properties.

The ORI problem is compounded by the fact that the most common method for increasing the octane rating of unleaded gasoline is to increase its aromatic content. This, however, eventually causes an even greater increase in the octane requirement. Moreover, some of presently used nitrogen-containing compounds used as deposit-control additives and their mineral oil or polymer carriers may also significantly contribute to ORI in engines using unleaded fuels.

It is, therefore, particularly desirable to provide deposit control additives which effectively control the deposits in intake systems of engines, without themselves eventually contributing to the problem.

In this regard, hydrocarbyl poly(oxyalkylene) aminocarbamates are commercially successful fuel additives which control combustion chamber deposits thus minimizing ORI.

The second complicating factor relates to the lubricating oil compatibility of the fuel additive. Fuel additives, due to their higher boiling point over gasoline itself, tend to accumulate on surfaces in the combustion chamber of the engine. This accumulation of the additive eventually finds its way into the lubricating oil in the crankcase of the engine via a "blow-by" process and/or via cylinder wall/piston ring "wipe down". In some cases, as much as 25%–30% of the non-volatile fuel components, i.e., including fuel additives, will eventually accumulate in the lubricating oil. Insofar as the recommended drain interval for some engines may be as much as 7,500 miles or more, such fuel additives can accumulate during this interval to substantial quantities in the lubricating oil. In the case where the fuel additive is not sufficiently lubricating oil compatible, the accumulation of such an oil-incompatible fuel additive may actually contribute to crankcase deposits as measured by a Sequence V-D test.

The incompatibility of certain fuel additives in lubricating oils, i.e., oils which contain other additives, arises in spite of the fact that some fuel additives are also known to be lubricating oil dispersants.

Several theories exist as to the cause of the lubricating oil incompatibility of certain fuel additives. Without being limited to any theory, it is possible that some of these fuel additives when found in the lubricating oil interfere with other additives contained in the lubricating oil and either counterbalance the effectiveness of these additives or actually cause dissolution of one or more of these additives including possibly the fuel additive itself. In either case, the incompatibility of the fuel additive with other additives in the lubricating oil demonstrates itself in less than desirable crankcase deposits as measured by Sequence V-D engine tests.

In another theory, it is possible that the accumulation of the fuel additive into the lubricating oil during the drain interval period surpasses its maximum solubility in the lubricating oil. In this theory, this excess amount of fuel additive is insoluble in the lubricating oil and is what causes increased crankcase deposits.

In still another theory, it is possible that the fuel additive will decompose in the lubricating oil during engine operation and the decomposition products are what cause increased crankcase deposits.

In any case, lubricating oil incompatible fuel additives are less than desirable insofar as their use during engine operation will result in increased deposits in the crankcase. This problem can be severe. For example, hydrocarbyl poly(oxyalkylene) aminocarbamate fuel additives, including hydrocarbyl poly(oxybutylene) aminocarbamate, are known to possess dispersant properties in lubricating oil. In this regard, it is recognized that the hydrocarbyl poly(oxybutylene) aminocarbamates are substantially more expensive than the hydrocarbyl poly(oxypropylene) aminocarbamates. However, because heretofore no known hydrocarbyl poly(oxypropylene) aminocarbamate was found to be sufficiently lubricating oil compatible, it was necessary to employ the more expensive hydrocarbyl poly(oxybutylene) aminocarbamates which are sufficiently lubricating oil compatible. Accordingly, it would be particularly advantageous to develop a hydrocarbyl poly(oxypropylene) aminocarbamate which is compatible in lubricating oil compositions.

The instant invention is directed to fuel compositions containing a novel class of hydrocarbyl poly(oxypropylene) aminocarbamates which as a fuel additive controls combustion chamber deposits thus minimizing ORI and in lubricating oil is compatible with the lubricating oil composition. The novel additives of this invention are alkylphenyl poly(oxypropylene) aminocarbamates having a molecular weight of about 600 to 6,000 wherein the alkyl group is substantially straight chain containing at least 15 carbon atoms.

2. Prior Art

Numerous references disclose hydrocarbyl poly(oxyalkylene) aminocarbamates as fuel additives. These include the following U.S. Pat. Nos.: 4,160,648; 4,243,798; 4,521,610; and 4,191,537; 4,270,930; 4,568,358; 4,197,409; 4,274,837; 4,236,020; 4,288,612.

Of particular relevance is U.S. Pat. No. 4,274,837 which discloses that hydrocarbyl poly(oxyalkylene) aminocarbamates containing certain poly(oxyalkylene) chains, i.e., oxypropylene, when used in fuels employed in combination with certain lubricating oils, produce crankcase varnish. This reference further discloses that lubricating oil compatible hydrocarbyl poly(oxypropylene) aminocarbamates are improved by employing the poly(oxypropylene) as a block copolymer having a terminus of 1 to 5 $C_9$ to $C_{30}$ oxyalkylene units.

U.S. Pat. No. 4,160,648 discloses an intake system deposit control additive for fuels which is a hydrocarbyl poly(oxyalkylene) aminocarbamate wherein the hydrocarbyl group is from 1 to 30 carbon atoms including alkyl or alkylphenyl groups. Specifically disclosed hydrocarbyl groups include tetrapropenylphenyl, olelyl and a mixture of $C_{16}$, $C_{18}$ and $C_{20}$ alkyl groups. Likewise, U.S. Pat. No. 4,288,612 discloses deposit control additives for gasoline engines which are hydrocarbyl poly(oxyalkylene) aminocarbamates wherein the hydrocarbyl group contains from 1 to about 30 carbon atoms including alkylphenyl groups wherein the alkyl group is straight or branched chain of from 1 to about 24 carbon atoms. U.S. Pat. No. 4,568,358 discloses diesel fuel compositions containing an additive such as a hydrocarbyl poly(oxyalkylene) aminocarbamate. This reference discloses hydrocarbyl groups such as alkyl groups of 1 to 30 carbon atoms; aryl groups of 6 to 30 carbon atoms, alkaryl groups of 7 to 30 carbon atoms, etc.

U.S. Pat. No. 4,332,595 discloses hydrocarbyl poly(oxyalkylene) polyamines wherein the hydrocarbyl group is a hydrocarbyl radical of 8 to 18 carbon atoms derived from linear primary alcohols.

U.S. Pat. Nos. 4,233,168 and 4,329,240 among others disclose lubricating oil compositions containing a dispersant amount of a hydrocarbyl poly(oxyalkylene) aminocarbamate.

While these prior art references disclose fuel compositions containing $C_1$ to $C_{30}$ hydrocarbyl poly(oxyalkylene) aminocarbamates which include the poly(oxypropylene) polymers, none of these references disclose the unique hydrocarbyl group of this invention nor do any of these references suggest that use of this unique hydrocarbyl group would overcome the art recognized problem of lubricating oil incompatibility arising from using the prior art hydrocarbyl poly(oxypropylene) aminocarbamates.

SUMMARY OF THE INVENTION

The instant invention is directed toward a fuel composition containing a novel class of hydrocarbyl poly(oxypropylene) aminocarbamates which as a fuel additive controls combustion chamber deposits thus minimizing ORI and in lubricating oil is compatible with the lubricating oil composition. In particular, the instant invention is directed toward a fuel composition comprising a hydrocarbon boiling in the gasoline or diesel range and from about 30 to about 5,000 parts per million of an alkylphenyl poly(oxyalkylene) aminocarbamate having at least one basic nitrogen and an average molecular weight of about 600 to 6,000 and wherein the alkyl group of said alkylphenyl poly(oxypropylene) aminocarbamate is substantially straight-chain alkyl group of at least 15 carbon atoms. The instant invention is based on the discovery that use of the unique hydrocarbyl group, i.e., an alkylphenyl group wherein the alkyl group is a substantially straight-chain alkyl group of at least 15 carbon atoms, imparts to the alkylphenyl poly(oxypropylene) aminocarbamate lubricating oil compatibility.

DETAILED DESCRIPTION OF THE INVENTION

The alkylphenyl poly(oxypropylene) aminocarbamates of the present invention consist of an amino moiety and an alkylphenyl poly(oxypropylene) polymer bonded through a carbamate linkage, i.e., —OC(O)N<. The specific alkylphenyl group employed in the instant invention in the alkylphenyl poly(oxypropylene) polymer is critical to achieving lubricating oil compatibility for the alkylphenyl poly(oxypropylene) aminocarbamates. In particular, it has been found that employing the alkylphenyl group of this invention wherein the alkyl group is substantially straight-chain of at least 15 carbon atoms results in an alkylphenyl poly(oxypropylene) aminocarbamate which is lubricating oil compatible.

The Preferred Alkyphenyl Group

The preferred alkylphenyl group of the alkylphenyl poly(oxypropylene) aminocarbamate employed in this invention is derived from the corresponding alkylphenol of Formula I below:

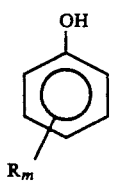

wherein R is a substantially straight-chain alkyl group of at least 15 carbon atoms and m is an integer from 1 to 2.

Preferably, R is substantially straight-chain alkyl group of from 20 to 50 carbon atoms. More preferably, R is a substantially straight-chain alkyl group of from 20 to 28 carbon atoms.

When m is one, the alkylphenyl is a monoalkylphenyl; whereas when m is two, the alkylphenyl is a dialkylphenyl.

The alkylphenols of Formula I above are prepared by reacting the appropriate olefin or olefin mixture with phenol in the presence of an alkylating catalyst at a temperature of from about 60° C. to 200° C., and preferably 125° C. to 180° C. either neat or in an essentially inert solvent at atmospheric pressure. A preferred alkylating catalyst is a sulfonic acid catalyst such as Amberlyst 15 ® available from Rohm and Haas, Phila., Pa. Molar ratios of reactants can be employed. When molar ratios are employed, the reaction yields a mixture of dialkylphenol, monoalkylphenol and unreacted phenol. As noted above, dialkylphenol and monoalkylphenol can be used to prepare the additives used in the compositions of this invention whereas the unreacted phenol is preferably removed from the post reaction mixture via conventional techniques. Alternatively, molar excess of phenol can be employed, i.e., 2 to 2.5 equivalents of phenol for each equivalent of olefin with unreacted phenol recycled. The latter process maximizes monoalkylphenol. Examples of inert solvents include benzene, toluene, chlorobenzene and 250 thinner which is a mixture of aromatics, paraffins and naphthenes.

Particularly preferred monoalkylphenols employed in this invention are either ortho-monoalkylphenols of Formula II below:

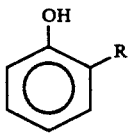

or para-monoalkylphenols of Formula III below:

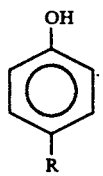

Particularly preferred dialkylphenols employed in this invention are generally 2,4-dialkylphenols of Formula IV below:

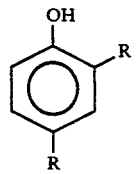

although there may be minor amounts of 2,6-dialkylphenol of Formula V below:

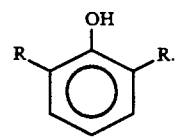

While both the ortho- and para-monoalkylphenol are equally preferred in the instant invention, if desired, the para content of the alkylphenol can be enhanced by employing a substantially straight-chain olefin fractions containing some branching in the molecular structure at the double bond such as structures VI and VII

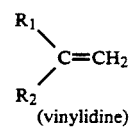

(vinylidine)

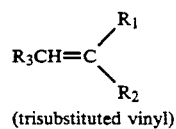

(trisubstituted vinyl)

wherein $R_1$, $R_2$ and $R_3$ form the remainder of the olefin. While being substantially straight-chain, the branched portion of the molecular structure allows for formation of a tertiary carbonium ion during the alkylation process. Without being limited to any theory, it is believed that the steric hindrance associated with a tertiary carbonium ion inhibits ortho alkylation and thereby results in enhanced para substitution.

Suitable substantially straight-chain olefins are those wherein about 75 to 100 number percent and preferably about 85 to 100 number percent of the individual carbon atoms of the olefin are either primary ($CH_3$—) or secondary (—$CH_2$—). Included in the terms primary or secondary are alpha olefins (—CH=$CH_2$) and internal olefins (—CH=CH—). In the converse, such substantially straight-chain olefins can contain from 0 to about 25 number percent although preferably from 0 to about 15 number percent of tertiary carbon atoms. Included within the term tertiary are trisubstituted vinyl groups (>C=CH—) and vinylidine (>C=$CH_2$).

Substantially straight-chain olefin fractions are commercially available products such as $C_{18}$–$C_{30}$ olefins, available from Ethyl Corporation, Baton Rouge, La. These olefins are substantially straight-chain in that from 80 to 100 number percent of the carbon atoms in the olefins are either primary or secondary. On the other hand, about 40 mole percent of the olefins contained in the olefin fraction are branched olefins. That is to say while being otherwise substantially straight-chain 40 mole percent of all of the olefins are branched in the form of trisubstituted vinyl or vinylidine structure.

Likewise, C20–C24 and C24–C28 olefin fractions, available from Chevron Chemical Company, San Francisco, Cal., are also substantially straight-chain but contain about 40 mole percent or more branched olefin, containing predominantly vinylidine olefin. Straight-chain olefins, containing less than about 5 mole percent branched olefins, are available from Shell Chemical Company, Houston, Tex.

This is the appropriate time to distinguish between "substantially" straight-chain olefins containing 75 to 100 number percent of either primary or secondary carbon atoms in the olefin" and a "substantially straight-chain olefin fraction wherein about 40 mole percent of the olefins are branched". In the first case, the olefin is viewed on a molecular basis and requires that at least 75 number percent of the carbon atoms be primary or secondary. In this case, a branched olefin such as trisubstituted vinyl or vinylidine is nonetheless substantially straight-chain if a sufficient number of the remaining carbon atoms are primary or secondary such that at least 80 number percent of the carbon atoms in this olefin are primary or secondary.

On the other hand, a substantially straight-chain olefin fraction wherein about 40 mole percent of the olefins are branched is viewed from a composition basis. That is the substantially straight-chain olefin fraction can contain olefins such as alpha olefins, internal olefins, trisubstituted vinyl and vinylidine. When viewing the entire substantially straight-chain olefin fraction, 40 mole percent of the olefins are branched, i.e., either trisubstituted vinyl or vinylidine, whereas the remainder are either alpha olefins or internal olefins.

Preferred Poly(oxypropylene) Component

The alkylphenyl poly(oxypropylene) polymers which are utilized in preparing the carbamates of the present invention are monohydroxy compounds, i.e., alcohols, often termed alkylphenyl "capped" poly(oxypropylene) glycols and are to be distinguished from the poly(oxypropylene) glycols (diols), which are not alkylphenyl terminated, i.e., not capped. The alkylphenyl poly(oxypropylene) alcohols are produced by the addition of propylene oxide to the alkylphenol of Formula I, i.e.,

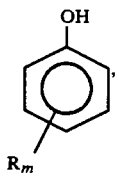   I under polymerization conditions, wherein R and m are as defined above. In general, the poly(oxypropylene) polymers will vary in chain length but their properties closely approximate those of the polymer represented by the average composition and molecular weight. Each poly(oxypropylene) polymer contains at least 1 oxypropylene unit, preferably from 1 to about 100 oxypropylene units, more preferably from about 5 to about 50 oxypropylene units, and most preferably from about 10 to about 25 oxypropylene units. Methods of production and properties of these polymers are disclosed in U.S. Pat. Nos. 2,841,479 and 2,782,240, which are incorporated herein by reference, as well as Kirk-Othmer's "Encyclopedia of Chemical Technology", Volume 19, p. 507. An alternative method for preparing alkylphenyl poly(oxypropylene) polymers having either 1, 2, or 3 oxypropylene units involves employing a compound of Formula VIII below

   VIII wherein q is an integer from 1 to 3. When employing the compound of Formula VIII, the phenoxide of the alkylphenol, I, is first prepared and then reacted with the compound of Formula VIII to yield the desired alkylphenyl poly(oxypropylene) polymer having from 1 to 3 oxypropylene units. Compounds of Formula VIII are commercially available or can be prepared by art recognized methods.

Preferred Amine Component

The amine moiety of the alkylphenyl poly(oxypropylene) aminocarbamate employed in this invention is preferably derived from a polyamine having from 2 to about 12 amine nitrogen atoms and from 2 to about 40 carbon atoms. The polyamine is preferably reacted with an alkylphenyl poly(oxypropylene) chloroformate to produce the alkylphenyl poly(oxypropylene) aminocarbamate additives finding use within the scope of the present invention. The chloroformate is itself derived from alkylphenyl poly(oxypropylene) alcohol by reaction with phosgene. The polyamine, encompassing diamines, provides the product alkylphenyl poly(oxypropylene) aminocarbamate with, on average, at least about one basic nitrogen atom per carbamate molecule, i.e., a nitrogen atom titratable by a strong acid. The polyamine preferably has a carbon-to-nitrogen ratio of from about 1:1 to about 10:1.

The polyamine may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms. At least one of the substituents on one of the basic nitrogen atoms of the polyamine is hydrogen, e.g., at least one of the basic nitrogen atoms of the polyamine is a primary or secondary amino nitrogen atom.

Hydrocarbyl, as used in describing all the components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylene and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxy-isopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ethoxyethoxy)ethoxy)ethyl, 3,6,9,12-tetraoxatetradecyl, 2-(2-ethoxyethoxy)hexyl, etc. The acyl groups of the aforementioned (C) substituents are such as propionyl, acetyl, etc. The more preferred substituents are hydrogen, $C_1-C_4$ alkyls and $C_1-C_4$ hydroxyalkyls.

In a substituted polyamine the substituents are found at any atom capable of receiving them. The substituted atoms, e.g., substituted nitrogen atoms, are generally geometrically inequivalent, and consequently the substituted amines finding use in the present invention can be mixtures of mono- and poly-substituted polyamines with substituent groups situated at equivalent and/or inequivalent atoms.

The more preferred polyamine finding use within the scope of the present invention is a polyalkylene polyamine, including alkylene diamine, and including substituted polyamines, e.g., alkyl and hydroxyalkyl-substituted polyalkylene polyamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethyl-propylene trimethylene, 1,3,2-hydroxypropylene, etc. Examples of such polyamines include ethylene diamine, diethylene triamine, di(trimethylene)triamine, dipropylene triamine, triethylene tetramine, tripropylene tetramine, tetraethylene pentamine, and pentaethylene hexamine. Such amines encompass isomers such as branched-chain polyamines and the previously mentioned substituted polyamines, including hydroxy- and hydrocarbyl-substituted polyamines. Among the polyalkylene polyamines, those containing 2-12 amine nitrogen atoms and 2-24 carbon atoms are especially preferred, and the $C_2-C_3$ alkylene polyamines are most preferred, in particular, the lower polyalkylene polyamines, e.g., ethylene diamine, diethylene triamine, propylene diamine, dipropylene triamine, etc.

The amine component of the alkylphenyl poly(oxypropylene) aminocarbamate also may be derived from heterocyclic polyamines, heterocyclic substituted amines and substituted heterocyclic compounds, wherein the heterocycle comprises one or more 5-6 membered rings containing oxygen and/or nitrogen. Such heterocycles may be saturated or unsaturated and substituted with groups selected from the aforementioned (A), (B)(, (C) and (D). The heterocycles are exemplified by piperazines, such as 2-methylpiperazine, N-(2-hydroxyethyl)piperazine, 1,2-bis-(N-piperazinyl)ethane, and N,N'-bis(N-piperazinyl)piperazine, 2-methylimidazoline, 3-aminopiperidine, 2-aminopyridine, 2-(3-aminoethyl)-3-pyrroline, 3-aminopyrrolidine, N-(3-aminopropyl)-morpholine, etc. Among the heterocyclic compounds, the piperazines are preferred.

Another class of suitable polyamines are diaminoethers represented by Formula IX

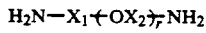

wherein $X_1$ and $X_2$ are independently alkylene from 2 to about 5 carbon atoms and r is an integer from 1 to about 10. Diamines of Formula IX are disclosed in U.S. Pat. No. 4,521,610, which is incorporated herein by reference for its teaching of such diamines.

Typical polyamines that can be used to form the compounds of this invention by reaction with a poly(oxyalkylene)chloroformate include the following: ethylene diamine, 1,2-propylene diamine, 1,3-propylene diamine, diethylene triamine, triethylene tetramine, hexamethylene diamine, tetraethylene pentamine, dimethylaminopropylene diamine, N-(beta-aminoethyl)piperazine, N-(beta-aminoethyl)piperidine, 3-amino-N-ethylpiperidine, N-(beta-aminoethyl)morpholine, N,N'-di(beta-aminoethyl)piperazine, N,N'-di(beta-aminoethylimidazolidone-2; N-(beta-cyanoethyl)ethane-1,2-diamine, 1-amino-3,6,9-triazaoctadecane, 1-amino-3,6-diaza-9-oxadecane, N-(beta-aimonoethyl)diethanolamine, N'-acetyl-N'-methyl-N-(beta-aminoethyl)ethane-1,2-diamine, N-acetonyl-1,2-propanediamine, N-(beta-nitroethyl)-1,3-propane diamine, 1,3-dimethyl-5-(beta-aminoethyl)hexahydrotriazine, N-(beta-aminoethyl)-hexahydrotriazine, 5-(beta-aminoethyl)-1,3,5-dioxazine, 2-(2-aminoethylamino)-ethanol, 2[2-(2-aminoethylamino)ethylamino]-ethanol.

The amine component of the alkylphenyl poly(oxypropylene) aminocarbamate may also be derived from an amine-containing compound which is capable of reacting with an alkylphenyl poly(oxypropylene) alcohol to produce an alkylphenyl poly(oxypropylene) aminocarbamate having at least one basic nitrogen atom. For example, a substituted aminoisocyanate, such as $(R)_2NCH_2CH_2NCO$, wherein R is, for example, a hydrocarbyl group, reacts with the alcohol to produce the aminocarbamate additive finding use within the scope of the present invention. Typical aminoisocyanates that may be used to form the fuel additive compounds of this invention by reaction with a hydrocarbylpoly(oxyalkylene) alcohol include the following: N,N-(dimethyl)aminoisocyanatoethane, generally, N,N-(dihydrocarbyl)aminoisocyanatoalkane, more generally, N-(perhydrocarbyl)isocyanatopolyalkylene polyamine, N,N-(dimethyl)aminoisocyanatobenzene, etc.

In many instances the amine used as a reactant in the production of the carbamate of the present invention is not a single compound but a mixture in which one or several compounds, predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be mainly tetraethylene pentamine and the empirical formula of the total amine composition will closely approximate that of tetraethylene pentamine. Finally, in preparing the compounds of this invention, where the various nitrogen atoms of the polyamine are not geometrically equivalent, several substitutional isomers are possible and are encompassed within the final product. Methods of preparation of amines, isocyanates and their reactions are detailed in Sidgewick's "The Organic Chemistry of Nitrogen", Clarendon Press, Oxford, 1966; Nollers' "Chemistry of Organic Compounds", Saunders, Philadelphia, 2nd Ed. 1957; and Kirk-Othmer's "Encyclopedia of Chemical Technology", 2nd Ed., especially Volume 2, pp. 99-16.

Preferred Alkylphenyl Poly(oxypropylene) Aminocarbamate

Having described the preferred alkylphenyl poly(oxypropylene) component and the preferred polyamine component, the preferred alkylphenyl poly(oxypropylene) aminocarbamate additive of the present invention is obtained by linking these components together through a carbamate linkage i.e.,

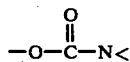

wherein the ether oxygen may be regarded as the terminal hydroxyl oxygen of the alkylphenyl poly(oxypropylene) alcohol component, and the carbonyl group —C-(O)— is preferably provided by the coupling agent, e.g., phosgene.

The alkylphenyl poly(oxypropylene) aminocarbamate employed in the present invention has at least one basic nitrogen atom per molecule. A "basic nitrogen atom" is one that is titratable by a strong acid, e.g., a primary, secondary, or tertiary amino nitrogen, as distinguished from, for example, an amido nitrogen, i.e.,

which is not so titratable. Preferably, the basic nitrogen is in a primary or secondary amino group.

The preferred alkylphenyl poly(oxypropylene) aminocarbamate has an average molecular weight of from about 600 to 6,000; preferably an average molecular weight of from 800 to 3,000; and most preferably an average molecular weight of from 1,000 to 2,500.

A preferred class of alkylphenyl poly(oxypropylene) aminocarbamate can be described by the following general formula

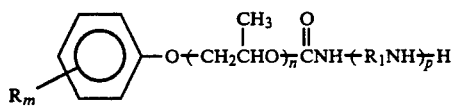

wherein R is a substantially straight-chain alkyl group of at least 15 carbon atoms; $R_1$ is alkylene of 2 to 6 carbon atoms; m is an integer from 1 to 2; n is an integer such that the molecular weight of the compound is from about 600 to 6,000; and p is an integer from 1 to about 6.

Preparation of the Alkylphenyl Poly(oxypropylene) Aminocarbamate

The additives employed in this invention can be most conveniently prepared by first reacting the appropriate alkylphenyl poly(oxypropylene) alcohol with phosgene to produce an alkylphenyl poly(oxypropylene) chloroformate. The chloroformate is then reacted with the polyamine to produce the desired alkylphenyl poly(oxypropylene) aminocarbamate.

Preparation of aminocarbamates are disclosed in U.S. Pat. Nos. 4,160,648; 4,191,537; 4,197,409; 4,236,020; 4,243,798; 4,270,930; 4,274,837; 4,288,612; 4,512,610; and 4,568,358, which are incorporated wherein poly(oxypropylene) compound and phosgene is usually carried out on an essentially equimolar basis, although excess phosgene can be used to improve the degree of reaction. The reaction may be carried out a temperatures from −10° to 100° C., preferably in the range of 0° to 50° C. The reaction will usually be complete within ¼ to 5 hours. Times of reaction will usually be in the range of from 2 to 4 hours.

A solvent may be used in the chloroformylation reaction. Suitable solvents include benzene, toluene, etc.

The reaction of the resultant chloroformate with the amine may be carried out neat or preferably in solution. Temperatures of from −10° to 200° C. may be utilized, the desired product may be obtained by water wash and stripping usually be the aid of vacuum, of any residual solvent.

The mol ratio of polyamine to polyether chloroformate will generally be in the range from about 2 to 20 mols of polyamine per mol of chloroformate, and more usually 5 to 15 mols of polyamine per mole of chloroformate. Since suppression of polysubstitution of the polyamino is usually desired, large molar excesses of the polyamine will be used. Additionally, the preferred adduct is the monocarbamate compound, as opposed to the bis(carbamate) or disubstituted aminoether.

The reaction or reactions may be conducted with or without the presence of a reaction solvent. A reaction solvent is generally employed whenever necessary to reduce the viscosity of the reaction product. These solvents should be stable and inert to the reactants and reaction product. Depending on the temperature of the reaction, the particular chloroformate used, the mol ratios, as well as the reactant concentrations, the reaction time may vary from less than 1 minute to 3 hours.

After the reaction has been carried out for a sufficient length of time, the reaction mixture may be subjected to extraction with a hydrocarbon-water or hydrocarbon-alcohol-water medium to free the product from any low-molecular-weight amine salts which have formed and any unreacted diamine. The product may then be isolated by evaporation of the solvent. Further purification may be effected by column chromatography on silica gel.

Depending on the particular application of the composition of this invention, the reaction may be carried out in the medium in which it will ultimately find use, e.g., polyether carriers or an oleophilic organic solvent or mixtures thereof and be formed at concentrations which provide a concentrate of a detergent composition. Thus, the final mixture may be in a form to be used directly for blending in fuels.

An alternative process for preparing the alkylphenyl poly(oxypropylene) aminocarbamates employed in this invention involves the use of an arylcarbonate intermediate. That is to say, the alkylphenyl poly(oxypropylene) alcohol is reacted with an aryl chloroformate to form an arylcarbonate which is then reacted with the polyamine to form the aminocarbamate employed in this invention. Particularly useful aryl chloroformates include phenyl chloroformate, p-nitrophenyl chloroformate, 2,4-dinitrophenyl chloroformate, p-chlorophenyl chloroformate, 2,4-dichlorophenyl chloroformate, and p-trifluoromethylphenyl chloroformate. Use of the aryl carbonate intermediate allows for conversion to aminocarbamates containing close to the theoretical basic nitrogen while employing less excess of polyamine, i.e., molar ratios of generally from 1:1 to about 5:1 of polyamine to the arylcarbonate, and additionally avoids the generation of hydrogen chloride in the reaction forming the aminocarbamate. Preparation of hydrocarbyl capped poly(oxyalkylene) aminocarbamates via an arylcarbonate intermediate are disclosed in U.S. Ser. Nos. 586,533 and 689,616, which are incorporated herein by reference.

Fuel Compositions

The alkylphenyl poly(oxypropylene) aminocarbamates of this invention will generally be employed in a hydrocarbon distillate fuel. The proper concentration of this additive necessary in order to achieve the desired detergency and dispersancy varies depending upon the type of fuel employed, the presence of other detergents, dispersants and other additives, etc. Generally, however, from 30 to 5,000 weight parts per million (ppm), and preferably 100 to 500 ppm and more preferably 200 to 300 ppm of alkylphenyl poly(oxypropylene) aminocarbamate per part of base fuel is needed to achieve the best results. When other detergents are present, a less amount of alkylphenyl poly(oxypropylene) aminocarbamate may be used. For performance as a carburetor detergent only, lower concentrations, for example 30 to 70 ppm may be preferred. Higher concentrations, i.e., 2,000 to 5,000 ppm may result in a clean-up effect on combustion chamber deposits.

The deposit control additive may also be formulated as a concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the additive will be ordinarily at least 5 percent by weight and generally not exceed 50 percent by weight, preferably from 10 to 30 weight percent.

When employing certain of the alkylphenyl poly(oxypropylene) aminocarbamates of this invention, particularly those having more than 1 basic nitrogen, it can be desirable to additionally add a demulsifier to the gasoline or diesel fuel composition. These demulsifiers are generally added at from 1 to 15 ppm in the fuel composition. Suitable demulsifiers include for instance L-1562 ®, a high molecular weight glycol capped phenol available from Petrolite Corp., Tretolite Division, St. Louis, Mo., and OLOA 2503Z ®, available from Chevron Chemical Company, San Francisco, Cal.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as aryl halides, e.g., dichlorobenzene or alkyl halides, e.g., ethylene dibromide. Additionally, antioxidants, metal deactivators and demulsifiers may be present.

In diesel fuels, other well-known additives can be employed such as pour point depressants, flow improvers, cetane improvers, etc.

The following examples are offered to specifically illustrate this invention. These examples and illustrations are not to be construed in any way as limiting the scope of this invention.

EXAMPLES

Example 1

Preparation of a $C_{20}$–$C_{24}$ Alkylphenol

To a 5-liter flask, equipped with stirrer, Dean Stark trap, condensor, and nitrogen inlet and outlet was added 50 gm of a substantially straight chain $C_{20}$ to $C_{24}$ olefin mixture (approximate olefin content $C_{18}$ and less-1%; $C_{20}$-49%; $C_{22}$-42%; $C_{24}$-8%; $C_{26}$ and greater-0.1%) wherein in the entire olefin fraction at least 15 mole percent of said olefins contain vinylidine groups ($C_{20}$ to $C_{24}$ olefins are available from Chevron Chemical Company, San Francisco, Cal.) 656 grams of phenol, 75 grams of a sulfonic acid cation exchange resin (polystyrene crosslinked with divinylbenzene) catalyst (Amberlyst 15 ® available from Rohm and Haas, Phila., Pa.). The reaction mixture was stripped by heating under vacuum and the product was filtered hot over diatomaceous earth to afford 1050 grams of a $C_{20}$ to $C_{24}$ alkylphenol with a hydroxyl number of 120 and with approximate 45% para-alkylphenol content.

Example 2

Preparation of $C_{20}$–$C_{28}$ Alkylphenol

To a 2-liter flask, equipped with stirrer, Dean Stark trap, condensor and nitrogen inlet and outlet was added 674 gms of a substantially straight chain $C_{20}$ to $C_{28}$ olefin mixture (olefin content: $C_{18}$-2%; $C_{20}$-28%; $C_{22}$-19%; $C_{24}$-13%; $C_{26}$-21%; $C_{28}$-11%; and greater than $C_{30}$-6%) wherein in the entire olefin fraction at least 20 mole percent of said olefins contain vinylidine groups ($C_{20}$–$C_{24}$ olefins and $C_{24}$–$C_{28}$ olefins are available from Chevron Chemical Company, San Francisco, Cal. and are then physically mixed at an equal mole basis to provide a $C_{20}$–$C_{28}$ olefin mixture), 211.5 grams of phenol, 43 grams of a sulfonic acid cation exchange resin (polystyrene crossinked with divinylbenzene) catalyst (Amberlyst 15 ® available from Rohm and Haas, Phila., Pa.). The reaction mixture was heated to about 140° C. for about 8 hours with stirring under a nitrogen atmosphere. The reaction mixture was stripped by heating under vacuum and the product was filtered hot over diatomaceous earth to afford 574 grams of a $C_{20}$–$C_{28}$ alkylphenol with a hydroxyl number of 110 and with 56% para-alkylphenol content.

Example 3

Preparation of Tetrapropenylphenol

To a 2-liter flask, equipped with stirrer, Dean Stark trap, condensor, and nitrogen inlet and outlet was added 567 grams of tetrapropylene, 540 grams of phenol, 72 grams of a sulfonic acid cation exchange resin (polystyrene crosslinked with divinylbenzene) catalyst (Amberlyst 15 ® available from Rohm and Haas, Phila., Pa.). The reaction mixture was heated to about 110° C. for about 3 hours with stirring under a nitrogen atmosphere. The reaction mixture was stripped by heating under vacuum and the resulting product filtered hot over diatomaceous earth to afford 626 grams of tetrapropenylphenol and with a hydroxyl number of 205 and with 96% para-alkylphenol content.

Example 4

Preparation of $C_{20}$ to $C_{28}$ Alkylphenol Poly(oxypropylene) Alcohol

To a dried 12-liter 3-necked flask under a nitrogen atmosphere was added 3.5 liter of toluene and 2020.5 grams (4.61 moles) of a $C_{20}$ to $C_{28}$ alkylphenol prepared in a manner similar to Example 2. The system was warmed to approximately 60° C. and 60 grams (1.54 moles) of metallic potassium cut into small pieces was slowly added with vigorous stirring. The temperature of the reaction system was allowed to increase during this addition and reached approximately 100° C. After 2½ hours, all of the metallic potassium was dissolved. The reaction system was then allowed to cool to 60° C. Afterwards, 4552 grams (78.37 moles) of propylene oxide was added to the system by an addition funnel at an addition rate slow enough to avoid flooding of the vapor condensing system, i.e., Dean Stark trap. The system was then gently refluxed for 72 hours at which point the temperature increased to 110° C. and was held there for an additional 3 hours. The system was then cooled to 60° C. and the reaction quenched by the addition of 0.54 liter of 3N HCl solution. The system was then dried by azeotropic distillation. The system was then diluted with 10 liters of hexane which was afterwards extracted three times with a slightly basic brine solution (pH≈8 to 9). In each extraction, a cuff between the aqueous solution and the hexane solution was formed. The cuff as well as the aqueous solution was discarded after each extraction. The resulting hexane solution was stripped and dried under elevated temperature and high vacuum to afford 4450 grams of the title compound as a light weight oil having a molecular weight of approximately 1435 and a hydroxyl number of 39.

Example 5

Preparation of $C_{20}$ to $C_{28}$ Alkylphenyl Poly(oxypropylene) Chloroformate To a 12-liter 3-necked flask under a nitrogen atmosphere was added 3 liters of anhydrous toluene and 3042 grams (2.6 moles) of $C_{20}$ to $C_{28}$ alkylphenyl poly(oxypropylene) alcohol prepared as in Example 4 above. The system was cooled to 5° C. with stirring. While stirring, 297 grams (3.0 moles) of liquid phosgene was added all at once to the reaction system. The reaction system was allowed to warm to room temperature and stirred gently for 24 hours. In order to remove excess phosgene as well as HCl formed during the reaction, the system was vigorously sparged with nitrogen. Infrared analysis of an aliquot revealed a strong chloroformate absorption at 1785 cm$^{-1}$ and no detectable alcohol absorption at 3450 cm$^{-1}$.

Example 6

Preparation of $C_{20}$ to $C_{28}$ Alkylphenyl Poly(oxypropylene) Ethylene Diamine Carbamate The entire chloroformate/toluene solution of Example 5 was diluted with 4 liters of dry toluene. In a separate flask, 2565 grams (42.7 moles) was also diluted with 4 liters of dry toluene. At room temperature, these two solution were rapidly mixed using two variable speed teflon gear pumps and a 10 inch Kenics static mixer. After fifteen minutes, the crude reaction mixture was stripped, diluted with 12 liters of hexane, and washed successively once with water and three times with a slightly basic (pH≈9) brine solution. Phase separation of the aqueous brine solution and the hexane solution was improved by adding brine as needed. The hexane solution was separated, dried over anhydrous sodium sulfate, filtered and stripped to afford the title product as a light yellow liquid which solidified to a loose paste upon cooling and having an alkalinity value of 30 and 0.75 weight percent basic nitrogen.

Example 7

Preparation of $C_{20}$ to $C_{28}$ Alkylphenyl Poly(oxypropylene) Diethylene Triamine Carbamate In the manner described in Example 6 above, 2256 grams (1.53 moles) of $C_{20}$ to $C_{28}$ alkylphenyl poly(oxypropylene) chloroformate prepared similarly to method described in Example 5 above was treated with 2654 grams (25.8 moles) of diethylene triamine to afford the title compound having an alkalinity value of 56 and 1.4 weight percent basic nitrogen.

Example 8

Preparation of n-Butyl Poly(oxypropylene) Ethylene Diamine Carbamate 2000 grams (0.91 moles) of n-butyl poly(oxypropylene) alcohol was prepared in the manner of Example 4 by substituting n-butanol for the $C_{20}$ to $C_{28}$ alkylphenol. The n-butyl poly(oxypropylene) alcohol was then treated with phosgene in the manner of Example 5 to yield the n-butyl poly(oxypropylene) chloroformate which was reacted with 1093 grams (18.2 moles) of ethylene diamine in the manner of Example 6 to yield the title compound as a light yellow liquid having an alkalinity value of 22.5 and 0.56 weight percent basic nitrogen.

Other hydrocarbyl poly(oxyalkylene) alcohols were prepared by employing different hydrocarbyl groups including those of Examples 2 and 3; by employing different poly(oxyalkylene) group of different chain lengths. Examples 9 through 17 found below in Table I summarizes the different hydrocarbyl poly(oxyalkylene) alcohols so prepared.

TABLE I

COMPOUNDS OF THE FORMULA

| Example | R$_3$ | R$_1$ | n |
|---------|-------|-------|---|
| 9 | n-butyl | —CH$_3$ | ~37 |
| 10 | n-butyl | —CH$_3$ | ~23 |
| 11 | tetrapropenylphenyl | —CH$_3$ | ~20 |
| 12 | tetrapropenylphenyl | —CH$_2$CH$_3$ | ~17 |
| 13 | C$_{20}$ to C$_{28}$ alkylphenyl | —CH$_3$ | ~17 |
| 14 | C$_{20}$ to C$_{28}$ alkylphenyl | —CH$_3$ | ~14 |
| 15 | C$_{20}$ to C$_{28}$ alkylphenyl | —CH$_3$ | ~10 |
| 16 | C$_{20}$ to C$_{28}$ alkylphenyl | —CH$_3$ | ~6 |
| 17 | C$_{20}$ to C$_{28}$ alkylphenyl | —CH$_2$CH$_3$ | ~17 |

Other hydrocarbyl poly(oxyalkylene) aminocarbamates were prepared by employing different hydrocarbyl groups including those of Examples 2 and 3 and by employing poly(oxyalkylene) groups of different chain lengths. Examples 18 through 28 found below in Table II summarizes the different hydrocarbyl poly(oxyalkylene) aminocarbamates so prepare.

TABLE II

COMPOUNDS OF THE FORMULA

| Example | R$_3$ | R$_1$ | R$_2$ | n | p |
|---------|-------|-------|-------|---|---|
| 18 | n-butyl | —CH$_3$ | —CH$_2$CH$_2$— | ~27 | 1 |
| 19 | n-butyl | —CH$_3$ | —CH$_2$CH$_2$— | ~23 | 1 |
| 20 | tetrapropenylphenyl | —CH$_3$ | —CH$_2$CH$_2$— | ~20 | 1 |
| 21 | tetrapropenylphenyl | —C$_2$H$_5$ | —CH$_2$CH$_2$— | ~17 | 1 |
| 22 | tetrapropenylphenyl | —C$_2$H$_5$ | —CH$_2$CH$_2$— | ~17 | 2 |
| 23 | C$_{20}$ to C$_{28}$ alkylphenyl | —CH$_3$ | —CH$_2$CH$_2$— | ~17 | 1 |
| 24 | C$_{20}$ to C$_{28}$ alkylphenyl | —CH$_3$ | —CH$_2$CH$_2$— | ~14 | 1 |
| 25 | C$_{20}$ to C$_{28}$ alkylphenyl | —CH$_3$ | —CH$_2$CH$_2$— | ~10 | 1 |
| 26 | C$_{20}$ to C$_{28}$ alkylphenyl | —CH$_3$ | —CH$_2$CH$_2$— | ~6 | 1 |
| 27 | C$_{20}$ to C$_{28}$ alkylphenyl | —CH$_3$ | —CH$_2$CH$_2$— | ~17 | 2 |
| 28 | C$_{20}$ to C$_{28}$ alkylphenyl | —CH$_2$H$_5$ | —CH$_2$CH$_2$— | ~17 | 1 |

Example 29

Oil Solubility Bench Test

This procedure was designed to determine the oil solubility/compatibility of different additives in a fully formulated lubricating oil. Insofar as much as 25-30% of a gasoline additive can enter into the crankcase via blow-by and/or cylinder wall/piston ring "wipe down", this is an important performance criteria The lubricating oil composition was formulated to contain: 6 percent by weight of a mono-polyisobutenyl succinimide; 20 millimoles per kilogram of a highly overbased sulfurized calcium phenate; 30 millimoles per kilogram of a highly overbased sulfurized calcium hydrocarbyl sulfonate; 22.5 millimoles per kilogram of a zinc dithiophosphate; 13 weight percent of a commercial nondispersant viscosity index improver; 5 parts per million of a foam inhibitor in 150N Exxon base oil to give a 10 W 40 formulated oil.

The oil solubility of the additive was determined as follows:

To a heated solution (50 grams) of the above-described lube oil was added 50 grams of the neat additive. The mixture was then heated with constant stirring to 170° F. and maintained at that temperature for 15 minutes. Dilutions were then prepared according to the desired solubility test range using fresh hot reference oil as the diluent. In each case, the diluted samples were stirred to 170° F. for 10 minutes to insure complete mixing. The solutions were then sealed and left to cool undisturbed for from 1-5 days typically at room temperature. Each sample was then rate visually for oil continuity.

Additives that were marginally soluble in this blend separate as a denser secondary phase, and were clearly visible as such without the need for centrifugation. Additives which gave rise to oil incompatibility problems were inherently oil soluble, however, they tended to displace what appears to be the VI improver. This phenomenon resulted in the separation of the VI improver which is less dense than the bulk oil forming a clear thick upper layer. The solubility/compatibility of a gasoline additive was thereby defined as the highest concentration (on a weight basis) which did not result in the formation of either an insoluble lower additive phase or an insoluble upper VI improver phase.

The oil solubility (or insolubility) of the hydrocarbyl poly(oxyalkylene) aminocarbamates including the alkylphenyl poly(oxypropylene) aminocarbamates of this invention is believed to correlate well to the oil solubility of the precursor hydrocarbyl poly(oxyalkylene) alcohol. Accordingly, Table III below contains solubility data for both the hydrocarbyl poly(oxyalkylene) alcohol and the hydrocarbyl poly(oxyalkylene) aminocarbamate derived therefrom. Oil solubility is reported weight percent of additive in the lubricating oil composition.

TABLE III

| Example No. | Oil Solubility |
|---|---|
| 9 | 5 |
| 10 | 8 |
| 11 | 18 |
| 12 | 27 |
| 13 | 40 |
| 14 | 50 |
| 15 | 50 |
| 16 | 50 |
| 17 | 50 |
| 18 | 0.5 |
| 19 | 1 |
| 20 | 7 |
| 21 | 15 |
| 22 | 15 |
| 23 | 16 |
| 24 | 20 |
| 25 | 45 |
| 26 | 50 |
| 27 | 16 |
| 28 | 16 |

Examples 9-12, 17, 18-22 and 28 represent prior art compositions. This Table establishes that the additives of this invention possess lubricating oil compatibility. This is particularly surprising in view of the fact that prior art hydrocarbyl poly(oxypropylene) aminocarbamates are not lubricating oil compatible, i.e., Examples 18, 19 and 20.

Example 30

A formulated oil containing an alkylphenyl poly(oxypropylene) aminocarbamate of this invention was tested in a Sequence V-D test method as well as formulated oils containing comparative hydrocarbyl poly(oxyalkylene) aminocarbamates This procedure utilizes a Ford 2.3-liter, four-cylinder Pinto engine. The test method simulates a type of severe field test service characterized by a combination of low speed, low temperature "stop and go" city driving and moderate turnpike operation. The effectiveness of the additives in the oil is measured in terms of the protection against sludge and varnish deposits on a 0 to 10 scale with 0 being black and 10 indicating no varnish or sludge deposits. The results of these tests are found in Table IV below.

The reference composition was formulated to contain: 6 percent by weight of a mono-polyisobutenyl succinimide; 20 millimoles per kilogram of a highly overbased sulfurized calcium phenate; 30 millimoles per kilogram of a highly overbased calcium hydrocarbyl sulfonate; 22.5 millimoles per kilogram of a zinc dithiophosphate; 13 weight percent of a commercial nondispersant viscosity index improver; 5 parts per million of a foam inhibitor in 150N Exxon base oil to give a 10 W 40 formulated oil.

Comparisons against this reference were made by employing an oil formulated identically as reference except for the additional amount of the additive as shown in Table IV below:

TABLE IV

Sequence V-D Engine Test Results

| Amount of Additive Added to Reference Oil | AS[1] | DEPOSITS AV[2] | PV[3] |
|---|---|---|---|
| — (Reference)[4] | 9.6 | 6.3 | 7.1 |
| 5.5% of Example 18[5] | 9.2[6] | 4.4[6] | 6.6[6] |
| 2.5% of Example 12[5] | 9.5 | 5.7 | 7.0 |
| 5.5% of Example 12[7] | 9.5–9.6 | 5.5 | 7.1 |
| 2.5% of Example 24[7] | 9.6 | 6.4 | 6.7 |
| 5.5% of Example 24[7] | 9.3–9.4 | 7.5 | 7.3 |

[1] average sludge
[2] average varnish
[3] piston varnish
[4] average of six runs
[5] one run
[6] oil rings and lash adjustors stick
[7] average of two runs Examples 12 and 12 represent prior art hydrocarbyl poly(oxyalkylene) aminocarbamates whereas Example 24 is an alkylphenyl poly(oxypropylene) aminocarbamate of this invention. This Table establishes that the alkylphenyl poly(oxypropylene) aminocarbamates of this invention gave decreased crankcase deposits as measured by average varnish in the Sequence V-D results compared to the prior art additives.

Example 31

The stability of certain fuel additives was measured by thermogravimetric analysis (TGA). The TGA procedure employed Du Pont 951 TGA instrumentation coupled with a microcomputer for data analysis. Samples of the fuel additives. (Approximately 25 milligrams) were heated isothermally at 200° C. under air flowing at 100 cubic centimeters per minute. The weight of the sample was monitored as a function of time. Incremental weight loss is considered to be a first order process. Kinetic data, i.e., rate constants and half-lives, were readily determined from the accumulated TGA data. The half-life measured by this procedure represents the time it takes for half of the additive to decompose. Half-life data for a fuel additive correlates to the likelihood that that additive will contribute to ORI. Lower half-lives represent a more easily decomposable product—one which will not as likely accumulate and form deposits in the combustion chamber. The half-life results obtained are shown in Table V below:

TABLE V

|  | Half-life (in minutes) |
|---|---|
| Example 21 | 60 |
| Example 23 | 160 |

Example 21 is a prior art fuel additive which is known to have minimally ORI contribution. Example 23 is a product employed in this invention. The above data establishes that Example 23 would also have minimal ORI contribution.

What is claimed is:

1. A fuel composition comprising a hydrocarbon boiling in the gasoline or diesel range and from about 30 to about 5,000 part per million of an alkylphenyl poly(oxypropylene) aminocarbamate having at least one basic nitrogen and an average molecular weight of about 1,000 to 2,500, wherein the alkyl group of said alkylphenyl poly(oxypropylene) aminocarbamate is derived from a substantially straight-chain $C_{20}$ to $C_{28}$ olefin mixture and wherein the aminocarbamate group of said alkylphenyl poly(oxypropylene) aminocarbamate is derived from a polyalkylene polyamine selected from the group consisting of ethylene diamine, propylene diamine, diethylene triamine and dipropylene triamine.

2. The fuel composition according to claim 1, wherein the alkyl group of said alkylphenyl poly(oxypropylene) aminocarbamate is derived from a substantially straight-chain $C_{20}$ to $C_{24}$ olefin mixture.

3. The fuel composition according to claim 1, wherein said alkylphenyl poly(oxypropylene) aminocarbamate contains from about 10 to 25 oxypropylene units.

4. The fuel composition according to claim 1, wherein the aminocarbamate group is derived from ethylene diamine.

5. A fuel composition comprising a hydrocarbon boiling in the gasoline or diesel range and from about 30 to about 5,000 parts per million of an alkylphenyl poly(oxypropylene) aminocarbamate of the formula:

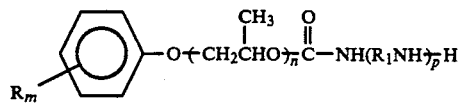

wherein R is an alkyl group derived from a substantially straight-chain $C_{20}$ to $C_{28}$ olefin mixture; $R_1$ is alkylene of from 2 to 3 carbon atoms; m is an integer from 1 to 2; n is an integer such that the molecular weight of the alkylphenyl poly(oxypropylene) aminocarbamate is from about 1,000 to 2,500; and p is an integer from 1 to 2.

6. The fuel composition according to claim 5, wherein R is an alkyl group derived from a substantially straight-chain $C_{20}$ to $C_{24}$ olefin mixture.

7. The fuel composition according to claim 5, wherein n is an integer from 10 to 25.

8. The fuel composition according to claim 5, wherein $R_1$ is alkylene of 2 carbon atoms and p is 1.

9. A fuel concentrate comprising an inert stable oleophilic organic solvent boiling in the range of 150° C. to 400° F. and from about 5 to 50 weight percent of an alkylphenyl poly(oxypropylene) aminocarbamate having at least one basic nitrogen and an average molecular weight of about 1,000 to 2,500, wherein the alkyl group of said alkylphenyl poly(oxypropylene) aminocarbamate is derived from a substantially straight-chain $C_{20}$ to $C_{28}$ olefin mixture and wherein the aminocarbamate group of said alkylphenyl poly(oxypropylene) aminocarbamate is derived from a polyalkylene polyamine selected from the group consisting of ethylene diamine, propylene diamine, diethylene triamine and dipropylene triamine.

10. The fuel concentrate according to claim 9, wherein the alkyl group of said alkylphenyl poly(oxypropylene) aminocarbamate is derived from a substantially straight-chain $C_{20}$ to $C_{24}$ olefin mixture.

11. The fuel concentrate according to claim 9, wherein said alkylphenyl poly(oxypropylene) aminocarbamate contains from about 10 to 25 oxypropylene units.

12. The fuel concentrate according to claim 9, wherein the aminocarbamate group is derived from ethylene diamine.

13. A fuel concentrate comprising an inert stable oleophilic organic solvent boiling in the range of 150° C. to 400° F. and from about 5 to 50 weight percent of an alkylphenyl poly(oxypropylene) aminocarbamate of the formula:

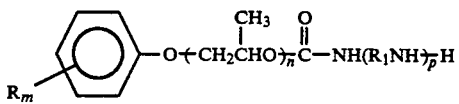

wherein R is an alkyl group derived from a substantially straight-chain $C_{20}$ to $C_{28}$ olefin mixture; $R_1$ is alkylene of from 2 to 3 carbon atoms; m is an integer from 1 to 2; n is an integer such that the molecular weight of the alkylphenyl poly(oxypropylene) aminocarbamate is from about 1,000 to 2,500; and p is an integer from 1 to 2.

14. The fuel concentrate according to claim 13, wherein R is an alkyl group derived from a substantially straight-chain $C_{20}$ to $C_{24}$ olefin mixture.

15. The fuel concentrate according to claim 13, wherein n is an integer from 10 to 25.

16. The fuel concentrate according to claim 13, wherein $R_1$ is alkylene of 2 carbon atoms and p is 1.

* * * * *